Figure 1:
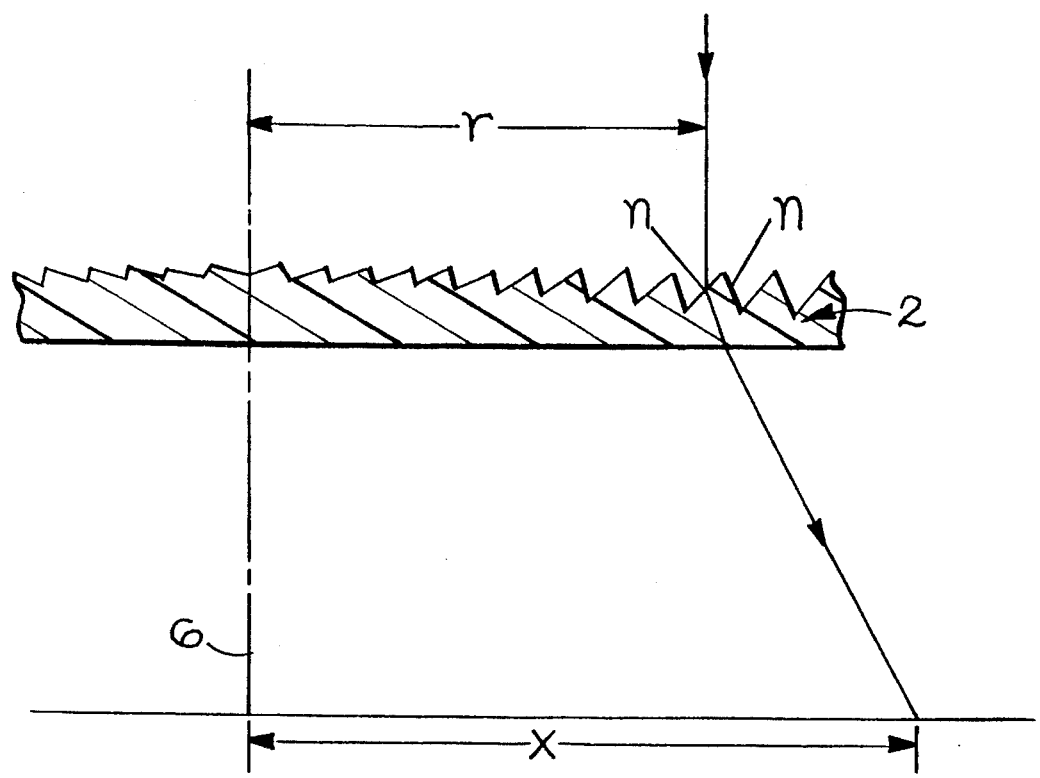

United States Patent [19]
Lea et al.

[11] Patent Number: 5,551,042
[45] Date of Patent: Aug. 27, 1996

[54] STRUCTURED FILMS AND USE THEREOF FOR DAYLIGHT ILLUMINATION

[75] Inventors: Michael C. Lea, Harlow, England; Paul A. Jaster, Arden Hills, Minn.

[73] Assignee: Minnesota Mining and Manufacturing Company, Saint Paul, Minn.

[21] Appl. No.: 53,064

[22] Filed: Apr. 26, 1993

[51] Int. Cl.$^6$ ........................................ G02B 3/08
[52] U.S. Cl. ............................ 359/742; 359/741
[58] Field of Search ........................ 359/742, 741, 359/743

[56] References Cited

U.S. PATENT DOCUMENTS

| | | | |
|---|---|---|---|
| 3,809,461 | 5/1974 | Baumgardner et al. | 359/742 |
| 3,809,462 | 5/1974 | Baumgardner et al. | 359/742 |
| 3,826,562 | 7/1974 | Baumgardner et al. | 359/742 |
| 3,972,596 | 8/1976 | Baumgardner et al. | 359/742 |
| 4,772,094 | 9/1988 | Sheiman | 359/742 |

Primary Examiner—Georgia Y. Epps
Assistant Examiner—Michael A. Papalas
Attorney, Agent, or Firm—Gary L. Griswold; Walter N. Kirn; Stephen W. Buckingham

[57] ABSTRACT

A daylighting system usable in either a skylight or a dormer includes a film having a plurality of negative Fresnel lenses.

13 Claims, 5 Drawing Sheets

STRUCTURED FILMS AND USE THEREOF FOR DAYLIGHT ILLUMINATION

This invention relates to structured films and to systems for the illumination of the interior of buildings with natural light using structured film in roof dormer windows and skylights.

Many large one-story commercial buildings such as warehouses, shops and factories have skylights in the roof to bring daylight into the building. Skylights which are simply clear windows in the roof transmit a large percentage of incident light into the building, but the illumination is direct sunlight which is highly uneven, causes glare, and is usually unacceptable.

A common form of skylight is a simple diffuser e.g. a sheet of translucent plastic, often with a pitched shape e.g. the product commercially available under the trade name Naturalite. While these are inexpensive, there are two disadvantages; firstly, the transmission is only around 30% with the remaining light being absorbed or scattered back out to the sky, and secondly, the angular spread of light entering the building is very wide and cannot be directed where it is needed.

Other forms of skylight rely on diffuse reflections from baffles or walls within a dormer structure e.g. the product commercially available under the trade name Okasolar. Again, diffuser elements severely limit the transmission into the building.

It is an object of the invention to provide alternative systems for bringing daylight into buildings.

According to one aspect of the present invention there is provided a transparent film having a structured surface forming a plurality of negative Fresnel lenses.

Structured films have an advantage over translucent diffusers because the light can be directed precisely where required, and because there are insignificant absorption or scattering losses. There are losses from partial (Fresnel) reflections and from light which totally internally reflects (TIR) back out to the sky but these can be minimized by suitable design.

It has been found that by providing structured films having a plurality of Fresnel lenses each designed to spread incoming light and to illuminate substantially the same area it is possible to provide more uniform, non-glare illumination throughout the daylight hours than was possible with previous designs. Preferably there are numerous Fresnel lenses on the structured film each illuminating substantially the same area. The lenses may be linear arranged in a parallel array, preferably having a width of not more than 15 cm, more preferably not more than 10 cm. Such linear film is suitable for use in east-west aligned windows. Generally, the Fresnel lenses are arranged in a matrix and each lens having a width and length of not more than 15 cm, preferably not more than 10 cm. The lenses may have any desired shape but are preferably close packed, adjacent lenses touching and are conveniently, rectangular, hexagonal or preferably square. The shape of the lens dictates the shape of the area of illumination.

In accordance with the invention it is possible to design a dormer/structured film combination which has high transmission into the building and which provides reasonably uniform, non-glare illumination over a given floor area. The design is effective under a range of conditions including the morning, evening and winter when the sun is dimmer and low in the sky. Performance in direct (non-cloudy) sunlight is the priority rather than in overcast conditions.

There are three elements to the design of the invention:

1. The shape and orientation of the outer windows in the roof which determine the amount of sunlight available.
2. The structured film which spreads the light out.
3. A system of reflectors which direct the light to the floor.

There are two broad design categories:

1. Structured film on the window which spreads the light first, followed by reflectors which redirect it to the floor.
2. Clear windows, followed by reflectors which steer the light to the structured film, which means that the spreading is done last.

As a general rule, category 2 designs have better performance, while category 1 designs use less material, are simple to build, and are consequently less expensive and more practical.

It is difficult to design a film which spreads and redirects light without large TIR losses at some angles. It can be done if the range of incident angles is small but this is not true for the practical situation of direct sunlight. In the designs proposed, the film is only intended to spread the light without any net change in the light's direction, and redirection is performed by separate reflectors.

There are three types of structured film in accordance with the invention:

1. Linear—which spreads the light in one dimension only, into a line.
2. Radial—in which the facets of the lens are concentrically arranged and spread the light in two dimensions e.g. into a circular or square area, and
3. Two crossed linears—two linear films in contact with their prism directions at right angles.

Linear spreaders can be used with long dormers which extend across the east-west width of a building. In this case there is no need to spread the light east-west, and only north-south spreading is required. Radial or crossed linear spreaders must be used with dormers which are separated in the east-west direction.

In optical terms, the proposed structures are negative Fresnel lenses. A linear film is equivalent to a cylindrical lens, and a radial film is equivalent to a spherical lens.

Whilst in theory positive lenses could be used, they produce a "hot spot"—a focused image of the sun, which is a fire and safety risk and accordingly, such lenses are not preferred. Certain types of negative structure also produce hot spots, but the design of the film may be modified to avoid the problem. The film performance is somewhat degraded by this requirement, but from a safety point of view the elimination of hot spots is desired.

Figure 2:
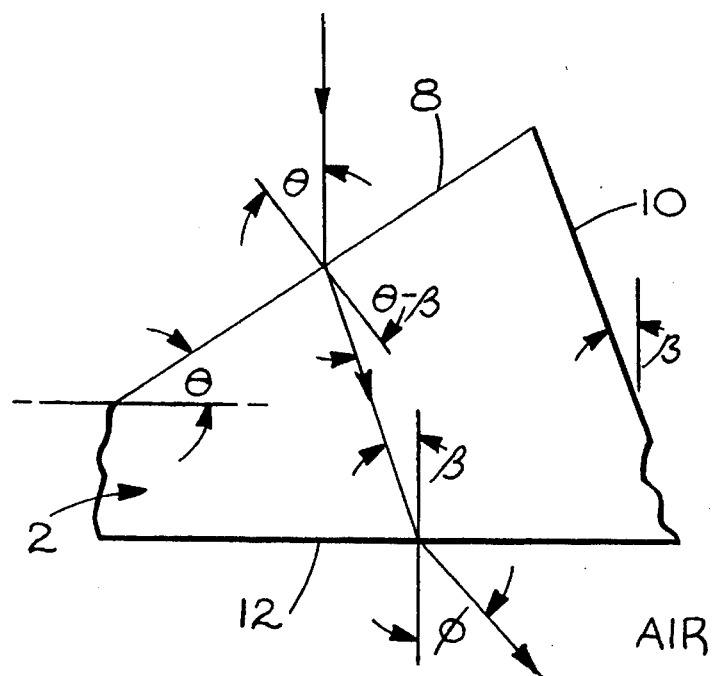
Figure 3:
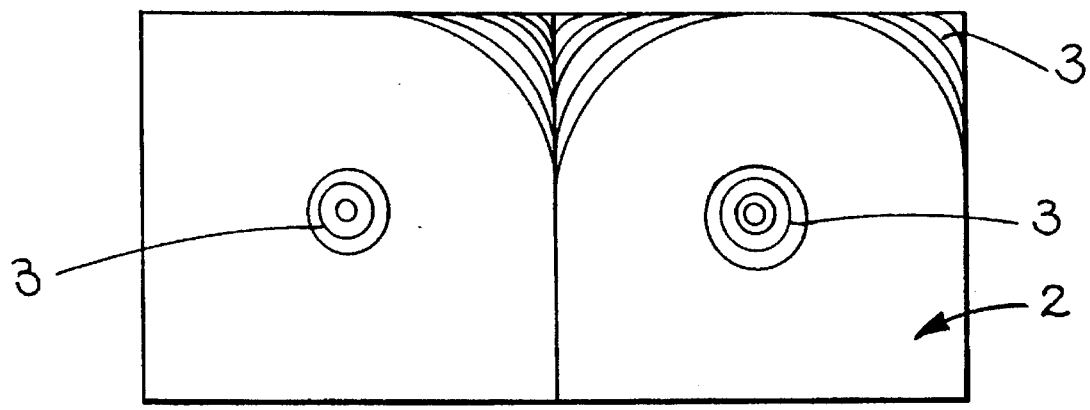
Figure 4:
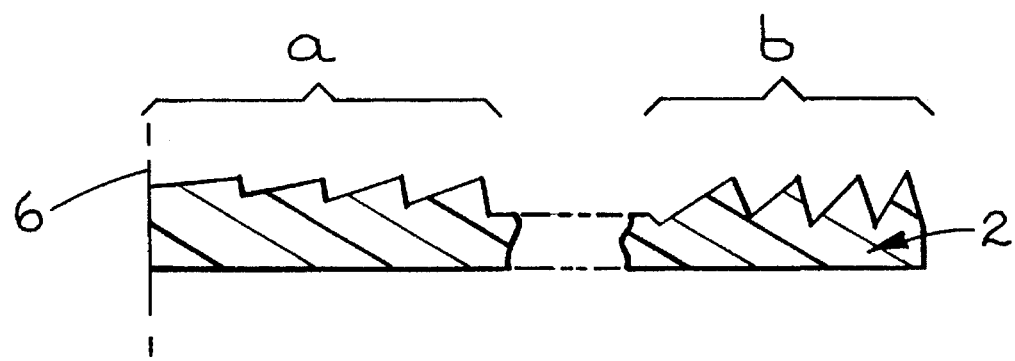
Figure 5:
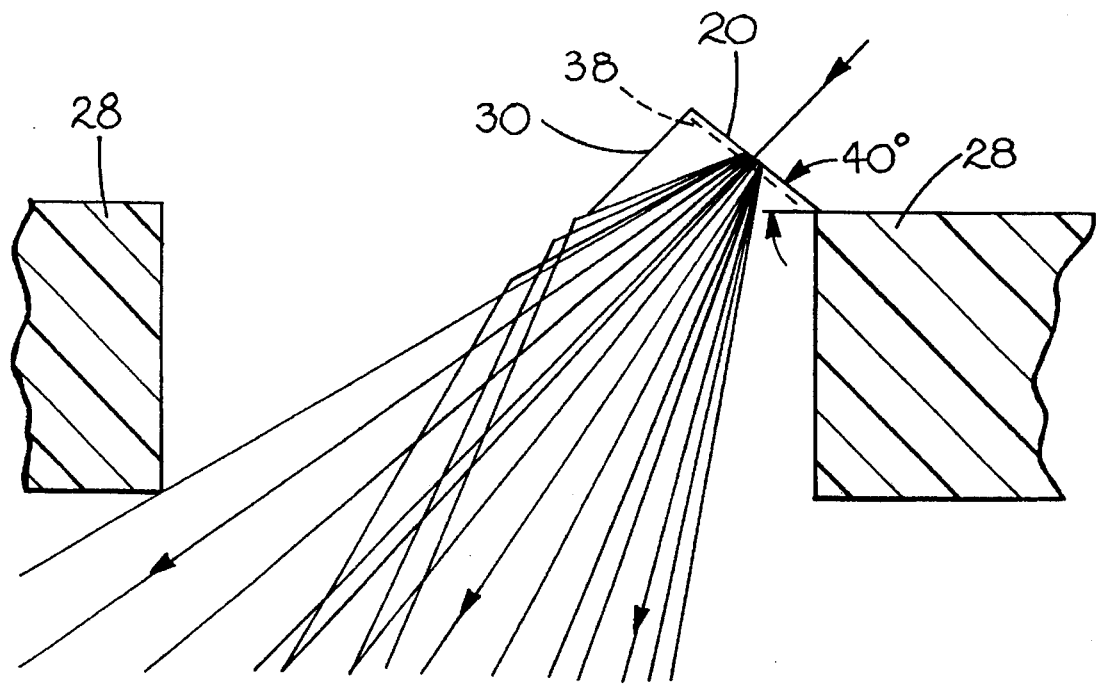
Figure 6:
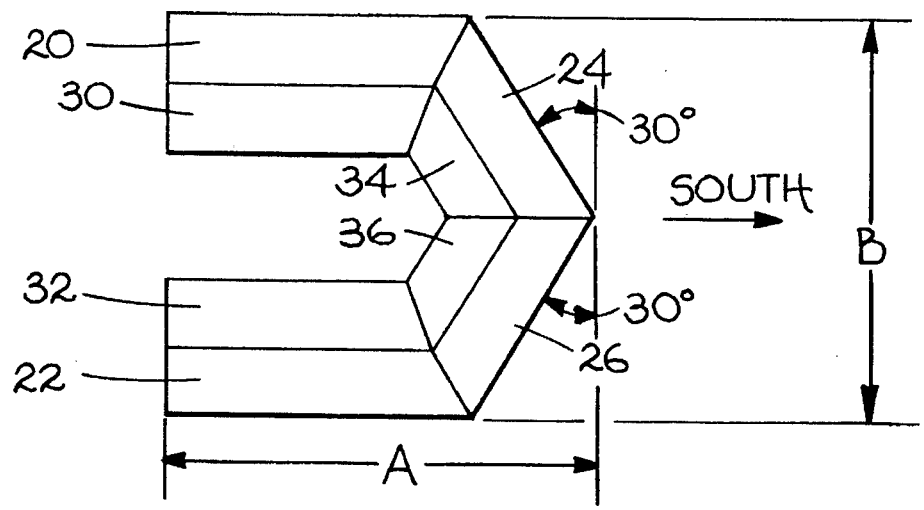
Figure 7A:
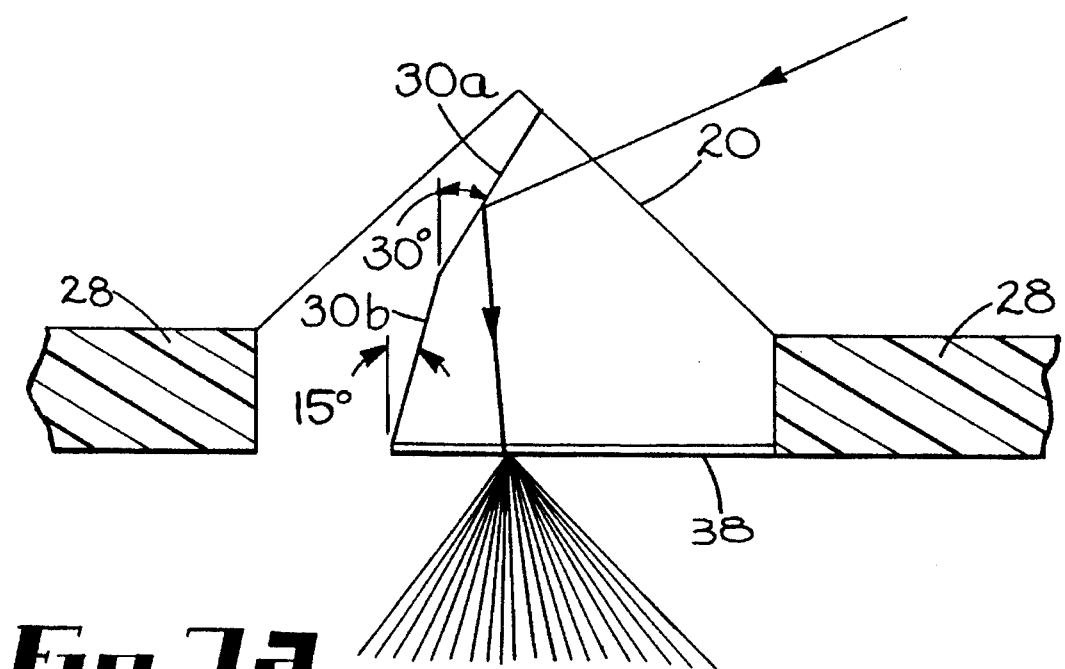
Figure 8A:
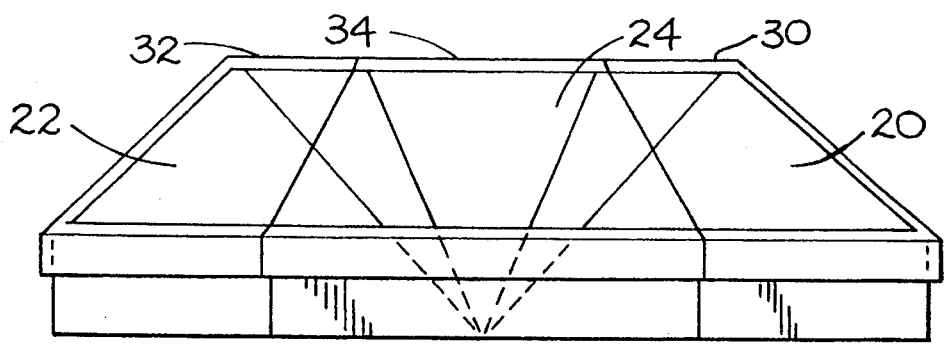
Figure 8B:
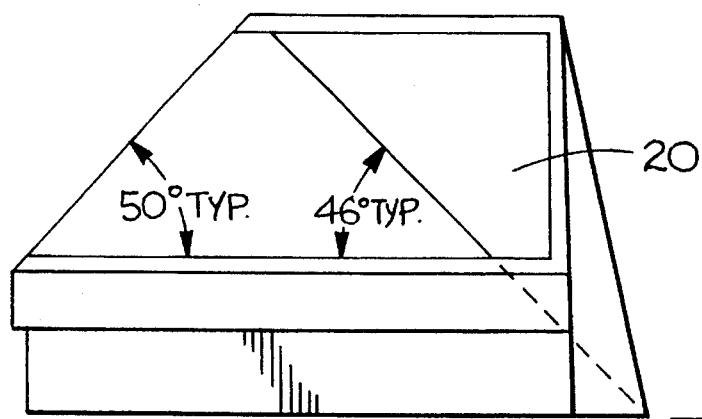
Figure 8C:
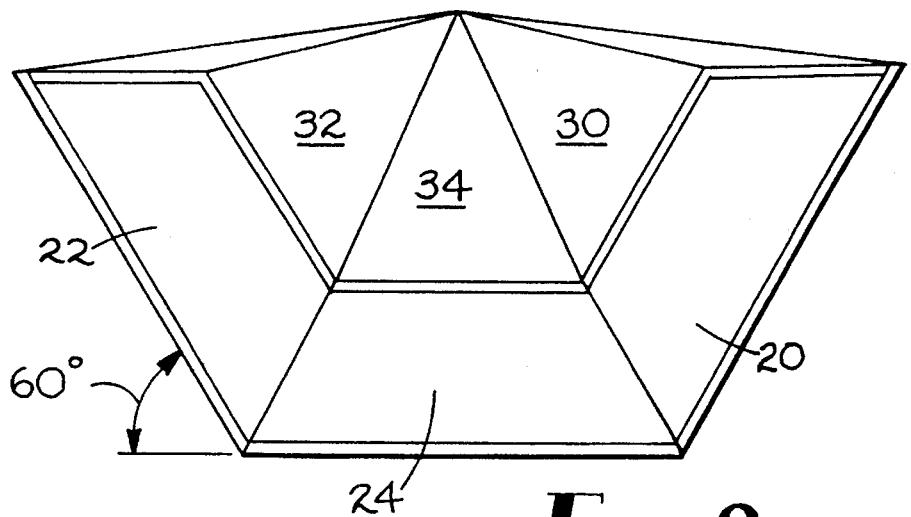

The invention will now be described with reference to the accompanying drawings in which:

FIG. 1 represents a diagram showing the ray path through a Fresnel lens illuminating a floor area, FIG. 2 represents a diagram showing the ray path through a facet of a Fresnel lens, FIG. 3 represents a diagram showing a portion of structured film in accordance with the invention, FIG. 4 represents a section showing the structure of a Fresnel lens for use in the invention, FIGS. 5 and 6 represent a section and plan view of a dormer window in accordance with the invention, FIGS. 7(a) and (b) represent a section of a second dormer window design in accordance with the invention showing the ray paths at low and high sun angles respectively, and FIGS. 8(a) to (c) represent a south elevation, east elevation and underneath plan view of a further dormer window design in accordance with the invention.

The facet angles of the Fresnel lenses are determined by the requirement for uniform illumination on the floor, the floor area to be illuminated and the height of the lens above the floor. Thus, the lens construction is different from normal Fresnel lenses which are constructed to provide a sharp image.

Referring to FIG. 1, if a Fresnel lens (2) has m facets of equal width which must spread light over a square on the floor with a center to corner distance of d, then facet n must direct the light to a point on the floor a distance x from the central axis (6) given by:

$$x = \frac{nd}{m}$$

This is true for both linear and radial lenses.

The argument behind this relationship is simple for linear lenses: facets of equal width receive equal amounts of power which must be delivered to equal width strips on the floor to get even illumination. For a square radial lens the situation is more complicated, but leads to the same result. Each annular facet must deliver power to an equivalent annulus on the floor. As the facet radius increases, the facet area also increases, so the outer facets receive more power. However, the area which must be illuminated by each facet also goes up, and at the same rate, so the power per unit area on the floor stays constant. This is even true for the outermost facets which are chopped by the square lens outline and which are not full annuli. The annuli on the floor which these facets illuminate are similarly truncated.

This leads to the surprising conclusion that the profile of a radial lens should be exactly the same as the linear lens. A radial lens is simply a rotated version of the linear lens (provided that the shape of the illuminated area on the floor is the same as the lens shape—square in this case).

It is not necessary that the facet widths be equal. The above equation is simply modified to:

$$x = \frac{rd}{R}$$

Where r is the facet radius and R is the center to corner radius of the lens.

FIG. 2 is a diagrammatic representation of a ray passing through a facet of a Fresnel lens. The lens (2) has facet (8) and riser (10) and planar surface (12).

The emerging angle $\phi$ is determined by the position x on the floor (FIG. 1).

$$\tan \phi = \frac{x}{\text{roof height}}$$

Snell's Law at the lens surfaces:
1. Facet Surface $$\sin \theta = n \sin(\theta - \beta)$$

where n is the refractive index of the lens.
This may be rearranged to $$\tan \theta = \frac{n \sin \beta}{n \cos \beta - 1}$$

2. Planar Surface $$n \sin \beta = \sin \phi$$

For each facet the procedure is as follows:
1. find $\phi$ from knowledge of x and roof height 2. find $$\sin \beta \text{ from } \frac{\sin \phi}{n}$$

3. calculate facet angle $$\tan \theta = \frac{n \sin \beta}{n \cos \beta - 1}$$

Thus, Fresnel lenses of the invention comprise facets each set at an angle such that normally incident light is deviated by an angle $\phi$ where tan $\phi$ varies linearly with the facet radius.

The optimum riser angle for maximum transmission would be perpendicular to the film. However, light which TIR's off the risers would then focus beyond the lens forming an unacceptable hot spot. This hot spot cannot be eliminated entirely since some light will always TIR from the risers. However, it can be spread out to reduce the brightness to safe levels.

The angle of each riser is set so that it is parallel to rays inside the material for normally incident light (see FIGS. 1 and 2). No light then TIR's from the risers for normally incident rays. For non-normal rays, the TIR focus points are spread out beyond the lens. Testing has shown that there are still some visible bright spots in the transmitted light, but they can be eliminated by adding a very weak random ripple to the flat side of the lens.

The acceptance angle of a particular lens might be defined as the incident angle at which the transmission falls below 70%, and will depend on the spread angle. Higher spread angles require facets with steeper angles which cause more light to TIR. The acceptance angle may also be limited by the fact that the spread of light becomes less uniform away from the normal.

The cross section through a spreading lens shown in FIG. 1 would be translated perpendicular to the paper to produce a linear lens, and rotated about the axis to produce a radial. The radial would then be cut to a square shape so that a matrix of lenses could be assembled. Whilst a single lens in a window could be used it is much preferred that the individual radial lenses should be much smaller than the window in which they will be placed so that a larger number are used.

FIG. 3 illustrates two adjacent radial lenses comprising a plurality of concentric facets (3).

Exemplary radial lenses are 4 inches square, 0.1 inches thick, have 233 grooves, a spread angle of +/−40°, an acceptance angle of 35°, and are made of acrylic, polycarbonate, etc.

For manufacturing reasons, it is easiest to prepare Fresnel lenses by cutting a master with a constant groove depth, but them is also a practical upper limit on the groove width. Therefore, in the middle of the lens where the facets have shallow angles, the facet width is held constant e.g., at 0.03 inches and the depth is allowed to increase (area 'a' in FIG. 4). Beyond the point where the maximum groove depth is reached (e.g. 0.008 inches) the facets have constant depth and variable width (area 'b' in FIG. 4). At the extreme corner of the lens the groove width has dropped e.g. to about 0.008 inches.

The best orientation for the film is prisms towards the sun for two reasons:

1. There is bending of rays at both the prism side and the flat side. If the flat side faced the sun, it would not contribute to the spreading.
2. The transmission is higher. With the flat side towards the sun more light is TIR'ed back out to the sky.

The shape and orientation of the windows determine how much light is incident and available to the system at any particular time and date.

The acceptance angles of the spreading film must be taken into account to ensure that the sun is never significantly outside the acceptance cone of at least one window. If the windows have outer glazing, this is also a factor—the transmission of double glazing falls off rapidly for incidence angles larger than 60°.

The acceptance angle of the radial film is around 35°, so each window can cover a range of +/−35° or a total of 70°. Since the sun's angle can change by more than 180° over the course of a day, at least three windows (facing south, 70° east of south and 70° west of south) are needed to give good transmission into the building at all times. East/west facing windows should have a larger aperture than south facing windows to compensate for the lower sun brightness at the ends of the day. The east/west windows should also be more vertical than south windows because the sun is lower in the sky at the ends of the day. At a latitude of 40°, south facing windows should point about 40° from the zenith, and the east/west windows should point about 30° from zenith. These directions are approximately in the middle of the range of sun elevations. A four window design has better performance and naturally gives more emphasis to the east/west directions and there is no limit to the number of windows which may be present. As the number of windows increases, the shape of the dormer becomes more of a smooth curve, but there is more shading from the window frames. In the limit, the dormer could have a single curved window, and a similarly curved reflector. Because of the requirement for more aperture looking east/west, the best shape is not a semi-circle but more of a semi-ellipse with longer east/west arms. Another possibility is a semi-circle at the south end, with straight extensions on the east/west sides.

The reflectors behind the window must redirect the light to a roughly vertical direction, making sure that it avoids any interior building structure. An angle of around 45° is used in the current design which does not turn the light exactly vertical. On average, the light hits the floor somewhat north of the vertical position. This is done because the dormers are at the extreme south end of the roof openings, leaving free space for rays to hit the floor to the north, but none to the south. The advantage of reducing the bending of the light in this way is that less light has to hit the reflectors increasing the transmission. If the dormer were in the middle of the roof openings, the reflector angle would have to be adjusted to send the light more vertically.

In order to minimize the reflector area, and to ensure that the only surfaces visible from the window are the reflector and the floor, it is important that the reflectors be as close to the window as possible. For the same reason, the windows should be low and wide rather than tall and narrow.

FIGS. 6 and 5 show a top view and a cross section of a dormer design, intended for a latitude of 40° north. The dormer occupies a roof opening about 8 feet square (A=B=8 feet) and comprises four windows, an east window (20), a west window (22) and intermediate windows (24, 26) facing 150° and 210° respectively. The intermediate windows are orientated at an angle of 40° to the horizontal roof (26) and the east/west windows are at an angle of 60°. The window angle can vary, normally within the range 10° to 90° (vertical).

Each of the windows (20, 22, 24, 26) has an associated reflector (30, 32, 34, 36 respectively). The reflectors are positioned at an angle of 45° to the horizontal and may comprise any reflective material. Suitable materials include polished aluminum sheet or foil supported on a suitable substrate.

The structured film (38) is positioned at each window extending over the complete area of the window with the structured surface presented towards the sunlight. FIG. 5 shows the ray path of sunlight passing through the window and being spread by the structured film causing the light to be directed over a wide square area, approximately 24 feet square. A portion of the light spread by the structured film is redirected by the reflector (30).

The structured film comprises a matrix of Fresnel lenses each in the form of a square of side approximately 4 inches. Each of the lenses will direct light over substantially the same 24 feet square floor area (there will be minor variations at the perimeter of this floor area due to the slight displacement of one lens relative to the next). At different angles of incidence the amount of light reflected by the reflector will vary. Each window will receive different amounts of sunlight depending upon the time of day.

If the reflectors come before the spreading film, it is their job to ensure that light hitting the film is substantially vertical and always within the 35° acceptance angle. This is done by using at least two reflectors having different angles for low and mid-angle sun. Reflector angles of approximately 15° and 30° will achieve this. High-angle sun rays hit the spreading film directly. The sides of the dormer (i.e. the east/west sides in the case of a south facing dormer) must be similarly angled and reflective to cope with light coming in at angles away from the window normal. Thus the reflectors form a three-sided box with the window on the fourth side.

Figure 7B:
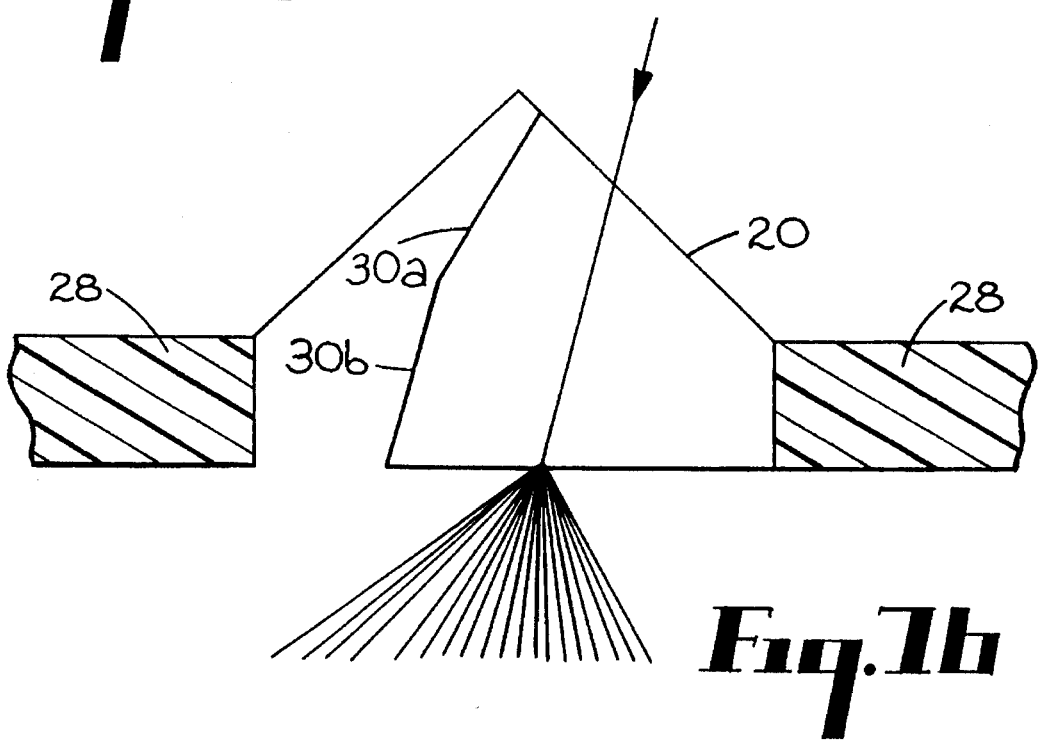

FIGS. 7(a) and 7(b) represent sections through an alternative design of dormer in which light may be reflected prior to being spread by the structured film. In FIGS. 7(a) and 7(b) identical numerals are used to represent like parts in FIGS. 5 and 6.

The reflector is formed of two-parts (30a, 30b) and is designed to reflect incident light to the structured film (38) which is positioned horizontally beneath the roof aperture. Section (30a) of the reflector is oriented at 30° to the vertical and section (30b) is oriented at 15° to the vertical. There may be any number of reflectors positioned to reflect incident light on the structured film. The reflectors should preferably not be curved since this would focus light and form an undesirable hot spot. The angles of the reflectors may vary, generally the upper reflectors will range from 5° to 60° to the vertical and the lower reflectors from 0° to 45° to the vertical.

FIG. 7(a) shows the ray path of incident sunlight at a low angle in which light is reflected from the reflector to the structured film (38) and thereafter spread to illuminate the floor area. FIG. 5(b) shows the ray path when the sun is at a high angle in which case light passes directly through the window to the structured film.

With the design of FIG. 7 it is more difficult to integrate south, east and west facing units into one dormer. To give good performance for all sun positions it is necessary to have completely separate units which may be arranged round a curve.

FIGS. 8(a) to (c) represent a south elevation, east elevation and underneath plan view of a further dormer window designed for use with a structured film on the windows followed by a reflector.

We claim:

1. A transparent film having a structured surface forming a plurality of negative Fresnel lenses each of said lenses having a plurality of refracting facets, each facet having an associated riser wherein each riser makes an angle with said film such that each riser is parallel to the direction of travel through the film for light incident on the riser's associated facet in a direction normal to said film.

2. A film as claimed in claim 1 comprising a parallel array of linear Fresnel lenses.

3. A film as claimed in claim 1 comprising parallel arrays of crossed linear Fresnel lenses.

4. A film as claimed in claim 1 in which each Fresnel lens has a width of no more than 15 cm.

5. A film as claimed in claim 4 in which each Fresnel lens has a width of no more than 10 cm.

6. A film as claimed in claim 1 comprising a matrix of radial Fresnel lens.

7. A film as claimed in claim 6 in which each Fresnel lens has a length and width of no more than 15 cm.

8. A film as claimed in claim 7 in which each Fresnel lens has a length and width of no more than 10 cm.

9. A film as claimed in claim 6 in which each lens is square.

10. A film as claimed in claim 1 having a thickness of about 0.1 inches.

11. A film as claimed in claim 1 in which the structured surface comprises at least 50 grooves per inch.

12. A film as claimed in claim 1 formed of acrylic or polycarbonate plastics material.

13. A transparent film having a structured surface forming a plurality of negative Fresnel lenses each having a plurality of facets in which the facets of each lens are each set at an angle such that normally incident light is deviated by an angle $\phi$ where $\tan \phi$ varies linearly with the facet radius.

* * * * *

UNITED STATES PATENT AND TRADEMARK OFFICE
CERTIFICATE OF CORRECTION

PATENT NO.: 5,551,042

DATED: August 27, 1996

INVENTOR(S): Michael C. Lea, Paul A. Jaster

It is certified that error appears in the above-identified patent and that said Letters Patent is hereby corrected as shown below:

Column 4, line 52, delete "them" and insert --there--.

Column 7, claim 6, line 14, delete "lens" and insert --lenses--.

Signed and Sealed this

Twenty-eighth Day of October, 1997

Attest:

BRUCE LEHMAN

Attesting Officer

Commissioner of Patents and Trademarks